United States Patent [19]
Hibiya et al.

[11] Patent Number: 6,136,420
[45] Date of Patent: Oct. 24, 2000

[54] LAMINATED POLYESTER FILM

[75] Inventors: Takashi Hibiya; Takatoshi Miki, both of Shiga-ken, Japan

[73] Assignee: Mitsubishi Polyster Film Corporation, Tokyo, Japan

[21] Appl. No.: 09/151,402

[22] Filed: Sep. 11, 1998

Related U.S. Application Data

[63] Continuation-in-part of application No. 08/815,090, Mar. 11, 1997, abandoned.

[30] Foreign Application Priority Data

Mar. 12, 1996 [JP] Japan ................................. 8-083197
Jul. 11, 1996 [JP] Japan ................................. 8-201113
Jul. 15, 1996 [JP] Japan ................................. 8-184845

[51] Int. Cl.⁷ ........................................................ B32B 3/26
[52] U.S. Cl. ........................ 428/213; 428/215; 428/218; 428/314.8; 428/319.3; 428/910
[58] Field of Search .................................. 428/215, 213, 428/218, 314.4, 314.8, 319.3, 480, 910; 521/138

[56] References Cited

U.S. PATENT DOCUMENTS 4,871,784  10/1989  Otonari et al. ........................... 521/138
5,045,384   9/1991  Otonari et al. ........................... 428/218

FOREIGN PATENT DOCUMENTS 0 360 201   3/1990   European Pat. Off. .
0 582 750   2/1994   European Pat. Off. .
3-178421    8/1991   Japan .
4-278392   10/1992   Japan .

OTHER PUBLICATIONS

Derwent Publications Ltd., Abstract No.92–277119 (1991), no month.
Derwent Publications Ltd., Abstract No.91–159224 (1991), no month.

*Primary Examiner*—Blaine Copenheaver
*Attorney, Agent, or Firm*—Foley & Lardner

[57] ABSTRACT

A laminated polyester film is disclosed which contains not more than 0.05% by weight of a fluorescent agent. The film comprises a fine cell-containing polyester film that contains 55 to 95% by weight of polyester and 5 to 45% by weight of an immiscible thermoplastic resin, said fine cell-containing polyester film having a density of 0.40 to 1.30 g/cm³ and at lest one other polyester. The other polyester film is laminated as an outermost layer on at least one of the surfaces of the fine cell-containing polyester film. It has a density of not less than 0.40 g/cm³ and not less than 0.01% by weight of a fluorescent whitening agent. The concentration of the fluorescent whitening agent in the other polyester film is higher than that in the fine cell-containing polyester film.

23 Claims, No Drawings

6,136,420

LAMINATED POLYESTER FILM

CROSS REFERENCE TO RELATED APPLICATION

This is a continuation-in-part of application Ser. No. 08/815,090, filed Mar. 11, 1997, now abandoned.

BACKGROUND OF THE INVENTION

The present invention relates to a laminated polyester film and more particularly, it relates to a laminated polyester film comprising a polyester layer containing a sufficient amount of fine cells and at least one other polyester layer containing substantially no fine cells (hereinafter referred to merely as "laminated polyester film") which has a reduced weight per unit volume and a good cushioning property, image-receiving papers suitable for a laser printer, a color printer and a video printer, and a mount suitable for seal print, which papers and mount are composed of the laminated polyester film.

Biaxially-oriented polyester films have widely used as industrial materials because they can exhibit well-balanced various properties or characteristics and are excellent in cost performance. Further, fine cell-containing polyester films which are produced as light-weight white opaque films having a good cushioning property by blending a polyester with a thermoplastic resin immiscible therewith and molding the resultant blend into a film shape, have been applied, for example, to synthetic papers such as image-receiving papers for a laser printer, a color printer or a video printer, or mounts for seal print, a base film of magnetic cards or the like. Especially, in the case where these films are used as the image-receiving papers, for enhancing a definition of images formed thereon, white pigments and/or fluorescent whitening agents are blended in the films so as to increase a yellowness thereof.

Also, the fine cell-containing polyester films have been applied to mounts (release backing paper) onto which an image-printed seal is attached, due to a high cushioning property thereof. For instance, the mounts have been used for a photo seal prepared by such an amusement apparatus in which a favorable frame configuration or background is first selected and then a photograph of a person or persons posed in front thereof is taken by an instant camera, so that many photo seals can be instantaneously produced.

In order to reduce the production cost of such white opaque films, it is required to use white pigments or fluorescent whitening agents effectively.

Further, as is well known in the art, when the fine cell-containing polyester films are used as a mount of image-receiving papers or printing papers, surface conditions thereof give a considerable influence on an quality of images printed thereon. Specifically, in the case where the film has a rough surface due to the waviness of fine cells present in close proximity to the surface, the definition of images printed thereon becomes deteriorated, so that there is caused such an inconvenience that no clear and fine images cannot be obtained.

Furthermore, when the fine cell-containing polyester film is produced, there arises such a problem that a cast roll, a stretching roll and the like are soiled by the immiscible thermoplastic resin present in close proximity to the surface of the film.

As a result of various studies by the present inventors, it has been found that, by laminating another specific polyester layer on at least one of surfaces of the base polyester film containing immiscible thermoplastic resin in a specified range, the obtained laminated polyester film exhibit a reduced weight per unit volume and good cushioning property. The present invention has been attained on the basis of the finding.

SUMMARY OF THE INVENTION

It is an object of the present invention to provide a laminated polyester film comprising a fine cell-containing polyester layer and a polyester layer as an outermost layer, formed on at least one of surfaces of the fine cell-containing polyester layer, which exhibits a reduced weight per unit volume due to a sufficient amount of fine cells contained therein, and an image-receiving paper for a laser printer comprising the laminated polyester film.

It is another object of the present invention to provide a laminated polyester film comprising a fine cell-containing polyester layer and a polyester layer as an outermost layer, formed on at least one of surfaces of the fine cell-containing polyester layer, which exhibits a sufficient surface yellowness at a relatively small amount of the fluorescent whitening agent, and an image-receiving paper for a color printer comprising the laminated polyester film.

It is a further object of the present invention to provide a laminated polyester film comprising a fine cell-containing polyester layer and a polyester layer as an outermost layer, formed on at least one of surfaces of the fine cell-containing polyester layer, which has no damage to cushioning property and prevents the surface conditions of the film from being adversely affected by the waviness of fine cells contained therein, and an image-receiving paper for a video printer comprising the laminated polyester film, which is capable of recording clear and fine images thereon.

It is a still further object of the present invention to provide a laminated polyester film comprising a fine cell-containing polyester layer and a polyester layer as an outermost layer, formed on at least one of surfaces of the fine cell-containing polyester layer, which can prevents roll members from being soiled during the production process and which can maintain a good flexibility by adjusting a ratio between thicknesses of both the layers to a specified range, and a mount for seal print comprising the laminated polyester film, which can exhibit a delustered surface and a good flexibility.

To accomplish the aim, in a first aspect of the present invention, there is provided a laminated polyester film which contains not more than 0.05% by weight of the fluorescent whitening agent and comprises:

a fine cell-containing polyester film comprising 55 to 95% by weight of polyester and 5 to 45% by weight of a thermoplastic resin, said fine cell-containing polyester film having a density of 0.40 to 1.30 g/cm$^3$; and at least one other polyester film laminated as an outermost layer on at least one of surfaces of said fine cell-containing polyester film, said other polyester film having a density of not less than 0.40 g/cm$^3$, said other polyester film containing not less than 0.01% by weight of a fluorescent whitening agent, and the concentration of the fluorescent whitening agent in said other polyester film being higher than that in said fine cell-containing polyester film.

In a second aspect of the present invention, there is provided a laminated polyester film comprising a fine cell-containing polyester film comprising 55 to 95% by weight of polyester and 5 to 45% by weight of a thermoplastic resin, the fine cell-containing polyester layer having a density of 0.40 to 1.30 g/cm³; and an other polyester layer having a density of not less than 0.40 g/cm³, laminated as an outermost layer, on at least one of surfaces of said fine cell-containing polyester film, wherein the said other polyester film contains not less than 0.01% by weight of a fluorescent whitening agent, whose concentration is higher than that in the fine cell-containing polyester film, and 0.3 to 30% by weight of a white pigment based on the total weight of the other polyester film, the yellowness on a surface of said other polyester film is not more than +3.0 and the optical density of said other polyester film is not less than 0.3.

In a third aspect of the present invention, there is provided a laminated polyester film comprising a fine cell-containing polyester film comprising 55 to 95% by weight of polyester and 5 to 45% by weight of a thermoplastic resin, the fine cell-containing polyester layer having a density of 0.40 to 1.30 g/cm³; and an other polyester layer having a density of not less than 0.40 g/cm³, laminated as an outermost layer, on at least one of surfaces of said fine cell-containing polyester film, wherein the thickness of said other polyester film is represented by the formula (1):

$$0.05d \leq T_B \leq 3d \tag{1}$$

where $T_B$ represents a thickness of the other polyester film after stretching and d (μm) represents an average particle diameter of the dispersed particles of the thermoplastic resin, contained in an unstretched sheet.

In a fourth aspect of the present invention, there is provided a laminated polyester film comprising a fine cell-containing polyester film comprising 55 to 95% by weight of polyester and 5 to 45% by weight of a thermoplastic resin, the fine cell-containing polyester layer having a density of 0.40 to 1.30 g/cm³; and an other polyester layer having a density of not less than 0.40 g/cm³, laminated as an outermost layer, on at least one of surfaces of said fine cell-containing polyester film, wherein the ratio of the thickness of said fine cell-containing polyester film to the thickness of said other polyester layer is represented by the formula (2):

$$10 \leq T_A/T_B \leq 500 \tag{2}$$

where $T_A$ represents a thickness of the fine cell-containing polyester film and $T_B$ represents a total thickness of said other polyester layer.

In a fifth aspect of the present invention there is provided a image-receiving paper for a laser printer, comprising the laminated polyester film defined in the first aspect.

In a sixth aspect of the present invention there is provided a image-receiving paper for a color printer, comprising the laminated polyester film defined in the second aspect.

In a seventh aspect of the present invention there is provided a image-receiving paper for a video printer, comprising the laminated polyester film defined in the third aspect.

In an eighth aspect of the present invention there is provided a mount for seal print, comprising the laminated polyester film defined in the fourth aspect.

DETAILED DESCRIPTION OF THE INVENTION

The present invention is described in detail below. The laminated polyester film according to the present invention comprises a fine cell-containing polyester film (A layer) and an other polyester film (B layer) laminated as an outermost layer, on at least one of surfaces of the said fine cell-containing polyester film (A layer).

Polyesters as raw materials of the laminated polyester film according to the present invention may be those produced from an aromatic dicarboxylic acid or an ester thereof and a glycol as primary starting materials, and having repeating units comprising not less than 80% of ethylene terephthalate units or ethylene-2,6-naphthalate units. Further, the polyesters may contain the third component unless the content thereof departs from the afore-mentioned range.

Examples of the suitable aromatic dicarboxylic acids used for the production of the polyester may include terephthalic acid, 2,6-naphthalene dicarboxylic acid, isophthalic acid, phthalic acid, adipic acid, sebacic acid, oxycarboxylic acid such as p-oxyethoxy-aromatic acid, or the like. These aromatic acids can be used singly or in the form of a mixture of any two or more thereof. Examples of the suitable glycols used for the production of the polyester may include ethylene glycol, diethylene glycol, propylene glycol, butane diol, 1,4-cyclohexane dimethanol, neopentyl glycol or the like. These glycols can be used singly or in the form of a mixture of any two or more thereof.

The A layer according to the present invention has a density of generally 0.40 to 1.30 g/cm³, preferably 0.60 to 1.20 g/cm³, more preferably 0.70 to 1.10 g/cm³. When the density of the A layer is more than 1.30 g/cm³, the amount of fine cells in the A layer becomes too small, so that cushioning property or paper feeling which are features of the laminated polyester film according to the present invention is apt to be damaged. On the other hand, when the density of the A layer is less than 0.40 g/cm³, the surface of the film is rendered extremely rough so that the quality of images formed on the film is likely to be deteriorated.

The B layer may contain any optional number of fine cells or almost no fine cells. The density of the B layer is generally not less than 0.40 g/cm³, preferably in the range of 0.60 to 1.50 g/cm³. When the density of the B layer is less than 0.40 g/cm³, the surface of the B layer is rendered extremely rough so that when a laminated film described in detail hereinafter is applied as an image-receiving paper, feeling of the images printed thereon is damaged and, therefore, the quality thereof becomes deteriorated.

The polyester used for the A layer has an intrinsic viscosity of generally 0.45 to 1.0, preferably 0.50 to 1.0 when measured immediately after being shaped into a film. When the intrinsic viscosity of the A layer is less than 0.45, the resultant film tends to suffer from breakage or rupture upon the film formation and further it is difficult to control the density of the A layer because the size of closed cells formed therein becomes uneven, resulting in deteriorated productivity. On the other hand, when the intrinsic viscosity of the A layer is more than 1.0, the resultant film of the A layer has a low stretchability so that there is a tendency that the amount of closed cells formed in the A layer is insufficient.

The polyester used in the B layer may have an intrinsic viscosity identical to or different from that of the polyester used in the A layer. However, it is preferred that the B layer as the outermost layer have a higher intrinsic viscosity than that of the A layer as an inner layer. This is because any breakage or rupture of the film is prevented from being caused during the film formation process and falling-off or separation of particles from a surface of the film is unlikely to occur.

In accordance with the present invention, in order to incorporate fine cells into the A layer, the thermoplastic resin immiscible with polyester is used. That is, in the film-forming process described in detail hereinafter, the immiscible thermoplastic resin blended in polyester is present in the form of dispersed particles when formed into an unstretched sheet, and thereafter, fine cells are produced in the A layer when the sheet is stretched.

Examples of the afore-mentioned thermoplastic resins immiscible with polyester may include polyolefins such as polyethylene, polypropylene, polymethyl pentene or polymethyl butene, polystyrene, polycarbonates, polyphenyl sulfides, liquid crystal polyesters or the like. Among them, polypropylene is preferably used from the standpoints of the production cost or the productivity.

Preferred polypropylenes are crystalline polypropylene homopolymers having usually not less than 95 mol %, preferably not less than 98 mol % of propylene units. In the case where non-crystalline polypropylene is used as the immiscible thermoplastic resin, the bleed-out of the polypropylene is caused on a surface of an amorphous polyester sheet, so that a cooling drum, a stretching roll or the like is apt to be soiled therewith. Also, if the polypropylene is copolymerized with more than 5 mol % of other units than propylene, e.g., ethylene units, there is a tendency that the amount of closed-cells may be formed in the polyester is insufficient.

The melt flow index (MFI) of the afore-mentioned polypropylene is usually in the range of 0.5 to 30 g/10 min, preferably 1.0 to 15 g/10 min. When the melt flow index of the polypropylene is less than 0.5 g/10 min, the size of the cells formed may become too large so that breakage or rupture of the resultant film may be likely to be caused upon stretching. On the other hand, when the melt flow index of the polypropylene is more than 30 g/10 min, clips of a tenter used as a stretching apparatus may be likely to release from the film, or the density of the film may be rendered non-uniform with elapsed time and, therefore, may become difficult to control, resulting in deteriorated productivity of the film.

The amount of the immiscible thermoplastic resin contained in the polyester is in the range of 5 to 45% by weight, preferably 5 to 35% by weight, more preferably 10 to 35%, still more preferably 10 to 25% by weight, most preferably 15 to 25% by weight based on the total weight of the polyester and immiscible thermoplastic resin. When the amount of the immiscible thermoplastic resin contained in the polyester is less than 5% by weight, the amount of fine cells formed in the film becomes too small so that the resultant film cannot exhibit a sufficiently reduced weight and good cushioning property. On the other hand, when the amount of the immiscible thermoplastic resin contained in the polyester is more than 45% by weight, the surface roughness of the resultant film becomes too large.

The fine cells in the A layer can be produced by stretching an unstretched sheet containing dispersed particles made of the immiscible thermoplastic resin, in at least one direction. According to knowledge of the present inventors, the size of the fine cells in the A layer and the waviness on a surface of the A layer are varied depending upon an average particle diameter (d) of the afore-mentioned dispersed particles of the immiscible thermoplastic resin.

The afore-mentioned dispersed particles of the immiscible thermoplastic resin are produced by the granulation of the immiscible thermoplastic resin when melt-blended together with the polyester in an extruder. For this reason, the average particle diameter of the dispersed particles of the immiscible thermoplastic resin can be controlled by changing a blending ratio of the immiscible thermoplastic resin to polyester, conditions upon melt-blending of the polyester and immiscible thermoplastic resin or the like.

Meanwhile, the dispersed particles in the unstretched sheet are of substantially a spherical shape and thereafter, undergoes the deformation of their shapes when subjected to subsequent film-formation process including stretching and heat-treating steps. That is, after subjected to the stretching and heat-treating steps, the dispersed particles in the layer A are present at a periphery of each of the fine cells and deformed into an ellipsoidal shape, a flat shape or the like. However, the dispersed particles are combined with each other so that the number of the dispersed particles in the laminated film are countable and measurable. Accordingly, by separating the dispersed particles in the layer A, and measuring the number of the dispersed particles and the density thereof per a predetermined weight, an average volume of one dispersed particle can be determined. This enables the average particle diameter of the spherical dispersed particles of the immiscible thermoplastic resin in the unstretched film to be calculated.

In accordance with the present invention, in order to control the size of the fine cells formed in the film-forming process (stretching step) so that the density and cushioning property of the layer A is adjusted to respective required ranges, it is preferred that a surfactant be incorporated in the polyester as a raw material for the A layer.

Examples of the suitable surfactants may include anionic surfactants, cationic surfactants, amphoteric surfactants, nonionic surfactants or the like. Among them, the nonionic surfactants, especially the silicone-based surfactants are preferable. Specific examples of the silicone-based surfactants may include organopolysiloxane-polyoxyalkylene copolymers, alkenyl siloxanes having branched chains of polyoxyalkylene, or the like. The amount of the surfactant contained in the polyester is generally in the range of 0.001 to 1.0% by weight, preferably 0.01 to 0.5% by weight. When the amount of the surfactant is more than 1.0% by weight, the effects by the addition of the surfactant can no longer be increased and there is a tendency that some troubles of the extruder used or deterioration in quality of polyester or the like may be caused.

Also, in accordance with the present invention, under the consideration of advantages of reducing the cost for raw materials and an environmental protection, in order to decrease an amount of film scraps which are discharged from a process for the production of films, the A layer may be produced by using both a reclaimed polyester and a virgin polyester as raw materials.

Such a reclaimed polyester nay be contained in the raw polyester in an amount of 5 to 60% by weight. The reclaimed polyester usable for this purpose may include, for example, reclaimed polyesters recovered from a base film of a magnetic card, PET bottles or the like, polyester scraps obtained by a direct polymerization process, or the like.

Especially, in the present invention, since the fine cell-containing polyester film (A layer) is covered with other polyester film (B layer), colored reclaimed polyester may be used as far as the color thereof can be corrected subsequently, As discussed above, extremely wide range of polymers can be used as the raw polyester for the A layer, which leads to such an advantage that the laminated polyester film can be produced with a low production cost by using the reclaimed polyesters or the like as the raw polyester for the A layer.

The afore-mentioned reclaimed polyesters is usually pulverized and then melt-extruded into reclaimed chips.

However, the reclaimed polyesters are not necessarily chipped but can be directly fed into a twin-screw extruder equipped with a vent together with virgin polyester after pulverization.

Further, as such reclaimed polyesters, there may be used trimmed film scraps discharged from the process for the production of fine cell-containing polyester films or fine sell-containing laminated polyester films in which immiscible thermoplastic resin is blended.

In accordance with the present invention, the amount of the reclaimed polyester used as the raw polyester of the A layer is in the range of 5 to 60% by weight, preferably 15 to 50% by weight, more preferably 30 to 40% by weight based on the total weight of polyesters used in the A layer. When the amount of the reclaimed polyester used is less than 5% by weight, the effects of reducing the cost for the raw materials cannot be sufficiently attained. On the other hand, when the amount of the reclaimed polyester used is more than 60% by weight, it is difficult to correct a color tone of the resultant film. Whereas, the amount of the virgin polyester used as the raw material is in the range of 40 to 95% by weight, preferably 50 to 85% by weight, more preferably 60 to 70% by weight based on the total weight of polyesters used in the A layer.

In addition, in accordance with the present invention, the blended polyester comprising the reclaimed Polyester and the virgin polyester has an intrinsic viscosity of 0.45 to 0.72, preferably 0.50 to 0.69, more preferably 0.55 to 0.65 when the blended polyester is shaped into a film. When the intrinsic viscosity of the blended polyester is out of the afore-mentioned range, a film having a sufficiently reduced weight and exhibiting good cushioning property may not be obtained.

It is preferred that, especially when applied to image-receiving papers, the laminated polyester film according to the present invention can exhibit a high optical density from the standpoint of enhancing a definition of images. Such a high optical density can be imparted by incorporating pigments such as titanium dioxide, barium sulfate or the like into the A layer.

Any two or more of these pigments can be incorporated in the A layer. In this case, it is preferred that at least titanium dioxide or barium sulfate be contained in the A layer. The average particle diameter of the afore-mentioned pigments is generally not more than 5.0 $\mu$m, preferably in the range of 0.01 to 3.0 $\mu$m. When the average particle diameter of the pigments is more than 5.0 $\mu$m, there may arise problems that the surface roughness of the film is too large, so that the quality of images printed on the film is deteriorated.

The amount of the pigments contained is generally in the range of 0.3 to 30% by weight, preferably 0.5 to 15% by weight, more preferably 1 to 5% by weight based on the weight of the A layer. When the amount of the pigments contained is less than 0.3% by weight, the laminated polyester film may have an insufficient yellowness as a whole, so that the quality of images printed thereon, especially contrast or definition thereof, is deteriorated. On the other hand, when the amount of the pigments contained is more than 30% by weight, there may arise problems that the pigments are coagulated to form large protrusions. In the case where two or more pigments are used, the total amount of the pigments is so controlled to the afore-mentioned range.

In accordance with the present invention, the pigment may be added to a reaction system during the synthesis of the A layer or directly to the polyester produced. In the case where the pigments are added during the synthesis of the A layer polyester, it is preferred that a slurry prepared by dispersing the pigment in ethylene glycol or the like may be added in an optional stage of the synthesis of the A layer. On the other hand, in the case where the pigments are directly added to the polyester produced, it is preferred that a dry powder or a slurry prepared by dispersing the pigments in water or an organic solvent having a boiling point of not more than 200° C. may be added to the A layer polyester by using a twin-screw extruder.

In order to control the amount of the pigments contained in the A layer, it is usable a method in which a master raw material containing a high concentration of pigments is prepared according to the afore-mentioned process and then the master raw material is diluted with a raw material containing substantially no pigments upon the film-forming process. Incidentally, the pigments may be subjected to pretreatments such as crushing, dispersion, classification, filtration or the like, if required.

Also, it is preferred that, especially when applied to image-receiving papers, the laminated polyester film according to the present invention has a high yellowness from the standpoint of enhancing a definition of images printed thereon. The yellowness of the laminated polyester film according to the present invention can be represented by a b value. The b value is preferably not more than −1.0, more preferably not more than −1.5. When the b value is more than −1.0, the color tone of the laminated polyester film may give an adverse influence on that of images printed thereon and, therefore, the film may have a deteriorated quality for printing or copying papers.

The yellowness of the laminated polyester film according to the present invention can be decreased by incorporating a fluorescent whitening agent to the raw polyester of the A layer. The preferred fluorescent whitening agents are "UBITEC" (produced by Chiba Geigy AG), "OB-1" (produced by Eastman Kodak Corp.) or the like. Further, the laminated polyester film according to the present invention has preferably a optical density of not less than 0.3, more preferably not less than 0.5. When the optical density is less than 0.3, the laminated polyester film may have an insufficient light-shielding property, so that the definition of images printed on the film may be deteriorated.

The laminated polyester film according to the present invention may be produced usually by laminating other polyester film (B layer) containing substantially no fine closed cells on the fine cell-containing polyester film (A layer) using a co-extruding method. More specifically, the raw materials for the respective layers are first melted in separate extruders and then the molten raw materials are introduced into a common die in which both the layers, which is maintained in a molten state, are laminated one over another and extruded through a slit-like opening to form a laminated sheet. Thereafter, the laminated sheet is subjected to stretching and heat-treating steps.

In the laminated polyester film according to the present invention, it is required that only the fine cell-containing polyester film satisfies the requirements concerning the intrinsic viscosity of the polyester and the amount of the immiscible thermoplastic resin added. Incidentally, in accordance with the present invention, appropriate additives such as an anti-oxidizing agent, a heat stabilizer, a lubricant, an anti-static agent, dyes, pigments or the like may be blended in the polyester or the immiscible thermoplastic resin, if required.

The total thickness of the laminated polyester film according to the present invention is generally in the range of 20 to 250 μm, preferably 20 to 125 μm. The thickness of the A layer is generally not less than 20%, preferably in the range of 50 to 99% based on the total thickness of the laminated polyester film. When the thickness of the A layer is less than 20%, the resultant laminated polyester film cannot satisfy the requirements such as reduced weight or good cushioning property.

The laminated polyester film according to the present invention can be applied to labels, recording papers, posters, planographic printing plates, wrapping materials or the like. Especially, the laminated polyester film according to the present invention can be preferably used as image-receiving papers for a laser printer.

Thus, the image-receiving papers for a laser printer according to the present invention comprise such a fine cell-containing laminated polyester film. The image-receiving papers according to the present invention are excellent in definition of the images printed thereon, and free from voids on the images printed and jamming upon paper-feeding, and can be produced with a low cost.

Next, laminated polyester films according to other preferred embodiments of the present invention are explained below.

Also, a first laminated polyester film. (hereinafter referred to merely as "laminated film (I)") is such a laminated film comprising the layer A and as the B layer, a polyester layer which contains a high concentration of the fluorescent whitening agent and a specific concentration of the white pigments (hereinafter referred to merely as "$B_1$" layer).

In the laminated film (I) according to the present invention, it is preferred that the concentration of the fluorescent whitening agent in the $B_1$ layer as an outermost layer is not less than 0.01% by weight and higher than that in the A layer, and the concentration of the white pigments in the $B_1$ layer is in the range of 0.3 to 30% by weight. Further, it is preferred that a surface of the $B_1$ layer exhibits the B value of not more than +3.0 and a optical density of not less than 0.3. when the b value is more than +3.0, the color tone of the $B_1$ layer is apt to adversely affect a color tone of the images printed thereon. The b value is more preferably not more than +1.0, still more preferably not more than −1.0. When the optical density is less than 0.3, the definition of the images printed may be deteriorated due to the lack of light-shielding properties so that the laminated polyester film may be deteriorated in suitability for image-receiving papers. The optical density of the $B_1$ layer is more preferably not less than 0.5.

When the amount of the fluorescent whitening agent contained in the $B_1$ layer is less than 0.01% by weight, it is difficult to attain the above-specified b value. It may be more preferred that the $B_1$ layer contains the fluorescent whitening agent in an amount of 0.01 to 0.30% by weight and in a concentration higher than that in the A layer. In a typical case, a fresh fluorescent whitening agent is incorporated only in the $B_1$ layer as an outermost layer to enhance an effect by the utilization thereof. In other words, it is intended that the amount of the fluorescent whitening agent contained in all the layers of the laminated polyester film (I) can be reduced.

The amount of the fluorescent whitening agent contained in the $B_1$ layer is still more preferably in the range of 0.04 to 0.30% by weight, It is still more preferred that the relationship between the concentrations of the fluorescent whitening agent contained in the A layer and $B_1$ layer is represented by the formula:

(Concentration in the $B_1$ layer (% by weight)) >(Concentration in the A layer (% by weight))+0.03 (% by weight).

The amount of the fluorescent whitening agent containing in the laminated polyester film (that is in total layers) is not more than 0.05% by weight, preferably 0.025% by weight, more preferably 0.01% by weight based on the weight of laminated polyester film. The lower limit of the said amount is more than 0% by weight. When the amount of the fluorescent whitening agent containing in the laminated polyester film is more than 0.05% by weight, there may be problems that the cost of raw material is increased, and vent-port and the portion in a slot die where the melt flows out may be contaminated with the fluorescent whitening agent because of increase of the amount of sublimation of fluorescent whitening agent.

When the amount of the white pigments contained in the $B_1$ layer is less than 0.3% by weight, there may be a likelihood that the above-specified optical density cannot be achieved. On the other hand, when the amount of the white pigments is more than 30% by weight, there may arise such a problem that particles of the white pigments may be coagulated to form larger protrusions on the surface of the film. In the case where two or more kinds of white pigments are used, it is preferred that a total amount of the white pigments is so controlled as to lie within the above-specified range.

The amount of the white pigments contained in the $B_1$ layer is more preferably in the range of 0.5 to 20% by weight, still more preferably 1.0 to 20% by weight. In this case, if two or more kinds of white pigments are used, the total amount of the white pigments is also adjusted so as to lie within the above-specified preferred ranges. Examples of the suitable white pigments may include titanium dioxide, barium sulfate or the like. In the case where two or more kinds of white pigments are used, at least one of the white pigments is preferably selected from titanium dioxide and barium sulfate.

The average particle diameter of the white pigments is preferably not more than 5.0 μm, more preferably in the range of 0.01 to 3.0 μm. When the average particle diameter of the white pigments is more than 5.0 μm, the surface roughness of the laminated film (I) may be too large, so that there may arise problems such as the deterioration in quality of the images printed thereon, the falling-off of the white pigments from the surface of the laminated film (I) or the like.

In accordance with the present invention, the additives such as the fluorescent whitening agent or the white pigments may be added to a reaction system during the synthesis of polyester or may be directly added to the polyester produced. In the case where the additives are added during the synthesis of polyester, it is preferred to add at an optional stage of the synthesis in the form of a slurry prepared by dispersing the additives in ethylene glycol or the like. On the other hand, in the case where the additives are directly added to the polyester produced, it is preferred to add in the form of a dry powder or a slurry prepared by dispersing the additives in water or an organic solvent having a boiling point of not more than 200° C. Such dry power or slurry may be blended with the By using a twin-screw extruder.

In order to control the amount of the additives added, it is usable a method in which a master raw material containing a high concentration of the additives is prepared according to the afore-mentioned process and then the master raw material is diluted with a raw material containing substantially no additives when being shaped into a film. Incidentally, the white pigments may be subjected to pretreatments such as crushing, dispersion, classification, filtration or the like, if required. Further, in accordance with the present invention, any other additives such as an anti-oxidizing agent, a heat stabilizer, an anti-static agent, dyes, pigments or the like may be blended in the polyester or the polypropylene, if required.

The laminated film (I) according to the present invention can be applied to labels, recording papers, posters, planographic printing plates, wrapping materials or the like in view of its excellent properties. Especially, the laminated film (I) according to the present invention can be preferably used as image-receiving papers for a color printer.

Thus, the image-receiving papers for a color printer according to the present invention comprise such a laminated film (I) in which the $B_1$ layer as an outermost layer functions as a printing surface The image-receiving papers for a color printer according to the present invention are excellent in concentration and definition of the images printed thereon, and free from voids on the images and jamming upon paper-feeding, and can be produced with a low cost.

Further, a laminated polyester film (hereinafter referred to merely as "laminated film (II)") is such a laminated film comprising the layer A and as the B layer, a polyester layer having a specific relation between an average particle diameter of dispersed particles made of the thermoplastic resin immiscible with polyester in the layer A of an unstretched sheet and the thickness of the B layer (hereinafter referred to merely as "$B_2$" layer).

In the laminated film (II) according to the present invention, the $B_2$ layer as an outermost layer is required to satisfy a predetermined relationship between its thickness and the afore-mentioned average particle diameter "d" ($\mu$m) of the dispersed particles made of the thermoplastic resin immiscible with polyester in the layer A of an unstretched sheet so as not to be adversely affected by the waviness on the surface of the A layer as an inner layer. That is, in accordance with the present invention, it is necessary that the $B_2$ layer satisfies the condition represented by the formula:

$$0.05 \leq T_B \leq 3d,$$

more preferably $0.1d \leq T_B \leq d$,
still more preferably $0.1d \leq T_B \leq 0.5d$ wherein d represents an average particle diameter ($\mu$m) of the dispersed particles and $T_B$ represents a thickness ($\mu$m) of the $B_2$ layer after stretching.

When the thickness $T_B$ of the $B_2$ layer is less than 0.05d, the surface of the $B_2$ layer may not be sufficiently prevented from being adversely affected by the waviness on the surface of the A layer. On the other hand, when the thickness $T_B$ of the $B_2$ layer is more than 3d, the laminated film (II) may exhibit insufficient cushioning property, and especially may be short of a suitability for image-receiving papers.

The density of the $B_2$ layer is varied by the addition of the white fine particles, but may be controlled so as to lie preferably in the range of 1.30 to 1.50 g/cm$^3$, more preferably 1.35 to 1.50 g/cm$^3$. When the density of the $B_2$ layer is less than 1.30 g/cm$^3$, there may be a tendency that the surface roughness of the $B_2$ layer becomes large, so that in the case where the laminated film (II) is intended to be used as an image-receiving paper, feeling of the images printed thereon may be damaged and the quality thereof may be deteriorated.

The surface roughness $R_a$ of the $B_2$ layer as an outermost layer of the laminated film (II) according to the present invention is varied depending upon the amount of fine cells in the A layer, the thickness of the $B_2$ layer, the amount of the white fine particles added or the like but may be controlled so as to lie preferably in the range of 0.08 to 0.30 $\mu$m, more preferably 0.10 to 0.20 $\mu$m. When the surface roughness $R_a$ is less than 0.08 $\mu$m, the surface of the laminated film (II) may be excessively flattened so that the images printed thereon may be likely to suffer from voids. On the other hand, when the surface roughness $R_a$ is more than 0.30 $\mu$m, the surface of the laminated film (II) may become too rough, so that there may be a tendency that the images printed thereon have a low concentration.

In the case where the laminated film (II) according to the present invention is used as an image-receiving paper (printing paper), it is preferred that the laminated film (II) has a good yellowness and a high optical density from the standpoint of enhancing the definition of the images printed thereon. The optical density of the laminated film (II) is preferably not less than 0.3, more preferably not less than 0.5. When the optical density of the laminated film (II) is less than 0.3, the light-shielding properties thereof may be insufficient so that the definition of the images printed thereon may be deteriorated.

The yellowness of the laminated film according to the present invention can be represented by the B value of (L, a, b) which is a color specification according to JIS Z-8722. The B value of the laminated film (II) is preferably not more than +3.0, more preferably not more than +1.0, still more preferably in the range of −5.0 to −1.0. When the B value of the laminated film (II) is more than +3.0, there may be a tendency that the color tone of the images printed on the film may be deteriorated.

The optical density and the yellowness of the laminated film (II) can be controlled by adding the white pigments to the $B_2$ layer constituting the laminated film (II). Further, the yellowness of the laminated film (II) can be increased by adding the fluorescent whitening agent thereto.

As the white pigments and fluorescent whitening agents for the laminated film (II), there can be used those white pigments and fluorescent whitening agents described for the laminated film (I). The amounts of the white pigments and the fluorescent whitening agents contained in the laminated film (II) may be the same as those for the afore-mentioned laminated film (I). Further, in order to enhance the optical density and the yellowness of the laminated film (II), the white pigments may be added to the A layer. In this case, the amount of the white pigments added to the A layer may be preferably in the range of 0.5 to 20% by weight, more preferably 1.0 to 20% by weight.

The laminated film (II) according to the present invention can be applied to labels, recording papers, posters, planographic printing plates, wrapping materials, tags of the like. Especially, the laminated film (II) according to the present invention can be preferably used as image-receiving papers for a video printer.

Furthermore, a laminated polyester film (hereinafter referred to merely as "laminated film (III)") is such a laminated film comprising the A layer and as the B layer, a polyester layer having a specific thickness relative to that of the A layer (hereinafter referred to merely as "$B_3$" layer).

In the laminated film (III) according to the present invention, it is preferred that the ratio ($T_A/T_{B3}$) of a film thickness $T_A$ of the A layer to a total film thickness $T_{B3}$ of the $B_3$ layer(s) is in the range of 10 to 500. The A layer comprises 5 to 45% by weight of the thermoplastic resin immiscible with polyester and has a density of 0.40 to 1.30 g/cm$^3$, thereby exhibiting a sufficient flexibility. When the $B_3$ layer(s) are laminated on one or both of opposite surfaces of the A layer to form a B/A/B layer structure or a B/A layer structure, there can be a tendency that the flexibility of the entire film is lost as the percentage of the $B_3$ layer is increased, because the $B_3$ layer contains substantially no fine cells. The ratio $T_A/T_{B3}$ is more preferably in the range of 50 to 500, still more preferably 80 to 500. When the ratio $T_A/T_{B3}$ is less than 10, the laminated film (III) may have an insufficient flexibility and, therefore, may lack a suitability for a mount for seals. On the other hand, the ratio $T_A/T_{B3}$ is more than 500, the thickness of the $B_3$ layer may become too small, so that there may arise such a problem that cast rolls, stretching rolls or the like may be soiled with the immiscible resin on the A layer.

The $B_3$ layer of the laminated film (III) may be a layer which contains substantially no thermoplastic resin immiscible with polyester. The density of the $B_3$ layer is preferably not less than 1.30 g/cm$^3$, more preferably in the range of 1.35 to 1.50 g/cm$^3$.

The surface roughness $R_a$ of the $B_3$ layer as an outermost layer of the laminated film (III) according to the present invention is preferably not less than 0.08 μm, more preferably in the range of 0.10 to 0.50 μm. When the surface roughness $R_a$ is less than 0.08 μm, the surface of the laminated film II) may be excessively flattened so that the surface conditions of the laminated film (III) considerably departs from the feeling of paper.

It is preferred that the laminated film (III) according to the present invention exhibits a good yellowness and a high optical density to impart a high-grade appearance to the film product especially when applied to a mount (release backing paper) for seal print.

Specifically, the optical density of the laminated film (III) according to the present invention is preferably not less than 0.3, more preferably not less than 0.5. When the optical density is less than 0.3, the light-shielding properties of the laminated film (III) may become insufficient so that the film may show a deteriorated suitability for seal print.

The yellowness of the laminated film (III) according to the present invention can be represented by the B value of (L, a, b) which is a color specification according to JIS Z-8722. The b value of the laminated film (III) is preferably not more than +3.0, more preferably not more than +1.0, still more preferably in the range of −9.0 to −1.0. When the b value of the laminated film (III) is more than +3.0, there is a tendency that the color tone of the mount may be adversely affected, resulting in damage to a high grade appearance thereof.

In order to enhance the optical density and the yellowness of the laminated film (III), the $B_3$ layer can also contain white pigments which are the same as or different from that in the A layer. The amount of the white pigments contained in the $B_3$ layer may be in the range of 0 to 20% by weight, preferably 1.0 to 20% by weight, more preferably 1.0 to 15% by weight.

The amounts of the fluorescent whitening agent to be contained in the respective layers of the laminated film (III) may be determined separately. When the concentration of the fluorescent whitening agent in the $B_3$ layer is higher than that in the A layer, the amount of the fluorescent whitening agent contained in all the layers of the laminated film (III) can be suitably reduced and, therefore, the efficiency of utilization thereof can be enhanced. The suitable amount of the fluorescent whitening agent contained in the $B_3$ layer is preferably in the range of 0 to 0.30% by weight, more preferably 0.04 to 0.30% by weight.

The amount of the fluorescent whitening agent containing in the laminated polyester film (that is in total layers) is not more than 0.05% by weight, preferably 0.025% by weight, more preferably 0.01% by weight based on the weight of laminated polyester film. The lower limit of the said amount is more than 0% by weight. When the amount of the fluorescent whitening agent containing in the laminated polyester film is more than 0.05% by weight, there may be problems that the cost of raw material is increased, and the vent-port of twin screw extruder and the portion in a slot die where the melt flows out may be contaminated with the fluorescent whitening agent because of increase of the amount of sublimation of fluorescent whitening agent.

The laminated film (III) according to the present invention can be applied to image-receiving papers for printers, labels, recording papers, posters, planographic printing plates, wrapping materials, tags or the like due to its excellent properties. Especially, the laminated film (III) according to the present invention is suitably used as a mount for seal print.

As the white pigments and the fluorescent whitening agents usable for the laminated film (III), the same materials as described for the laminated film (I) are exemplified.

In accordance with the present invention, in order to enhance a printability of the laminated film, the B layer thereof may be subjected to various surface treatments. Examples of the suitable surface treatments may include a coating treatment, a flame treatment, a plasma treatment, a corona-discharge treatment, an ultraviolet-irradiation treatment, an ion-plating treatment or the like. These treatments can be conducted in any optional stage of the process. Among them, the coating treatment is preferable because this coating treatment permits a coating layer having an extremely small thickness to be formed on the laminated film without damage to the unique feeling thereof, or it permits an appropriate counter measure to be readily taken in order to enhance the printability depending upon the applications thereof.

Any materials can be freely used as the components of the coating layer formed on the laminated film as far as the resultant laminated film can satisfy the afore-mentioned specific film properties according to the present invention. Examples of the suitable materials for the coating layer may include thermoplastic resins, cross-linkable resins or compositions containing various additives.

Specific examples of the suitable thermoplastic resins or cross-linkable resins for the coating layer may include thermoplastic polyesters; water-dispersible thermoplastic resins having a sulfonate group or the like; alkyd-based polyesters; organic solvent-soluble or water-dispersible polyurethane resins; polyisocyanate compounds; polyurethane resins having blocked terminal groups; organic solvent-soluble or water-dispersible vinyl-based resins such as vinyl chloride-vinyl acetate-based resins, vinylidene chloride-based resins, styrene-based resins, vinyl acetate-based resins or acryl-based resins; epoxy resins; silicone-based resins; urea-based resins; melamine-based resins: or the like. Examples of the suitable additives may include dyes, pigments, lubricants, anti-oxidizing agents, ultraviolet absorbing agents, anti-static agents, inorganic fine particles, surfactants or the like.

Any known coating apparatuses can be used to form the coating layer on the laminated film. Examples of the preferred coating apparatuses may include roll-type coaters such as a reverse-roll coater, a gravure coater, a kiss-roll coater or the like, though not restricted thereto.

The thickness of the coating layer may be varied appropriately. In accordance with the present invention, in order to maintain the unique feeling of the laminated film without damage thereto, the thickness of the coating layer is preferably in the range of 0.001 to 3 µm, more preferably 0.01 to 1 µm, still more preferably 0.01 to 0.5 µm.

The coating layer may be produced either at the final stage of the film formation or during any process for the production of the laminated film. In the latter case, a coating material may be applied to a surface of the film after it is uniaxially stretched in the longitudinal direction. Successively, the coated film is stretched in the transverse direction while the coating material is still kept in a wet state, and then subjected to the heat treatment. Such a method is advantageous from the standpoint of the reduction in production cost thereof because the film formation can be conducted simultaneously with the coating and drying processes.

Next, the process for the production of the laminated polyester film according to the present invention is described in detail below.

These laminated polyester film according to the present invention can be usually produced by a co-extrusion method in the following manner. First, the raw materials having the compositions for the respective layers are fed into corresponding individual extruders constituting a co-extruder. Specifically, depending upon the aimed layer structure of the laminated polyester film, raw material resins for the respective layers are charged to two or more extruders which are arranged corresponding to the number of the layers to be formed. The raw material resins are then melted and kneaded in the respective extruders every line. Thereafter, the molten resins are introduced into a two or more-layered multi-manifold or feed block and then extruded through a die in the form of a molten sheet. The conditions for the afore-mentioned melting and kneading processes can be controlled depending upon the average particle diameter of the dispersed particles made of polyester-immiscible thermoplastic resin, which particles are to be dispersed in the A layer.

For example, in the case where the aimed layer structure of the laminated polyester film is B/A/B, the respective raw materials for the A and B layers are melt-extruded through two separate extruders and then the melt line for the B layer can be divided into two melt sub-lines in the coarse thereof. A metering feeder such as a gear pump is arranged on each of the divided melt sub-lines to control a polymer flow rate for each of the B layers to be laminated over opposite surfaces of the A layer. The thickness of each B layer can be controlled by the polymer flow rate. As a matter of course, the metering feeder can be provided on a melt line for the A layer to effectively control a thickness thereof.

Next, the molten laminated sheet extruded from the die is rapidly cooled to a temperature below a glass transition temperature thereof on a rotary cooling drum to form a substantially amorphous unstretched sheet. In this case, in order to achieve an increased rapid cooling of the laminated sheet, it is required to enhance the adhesion between the laminated sheet and the rotary cooling drum. To this aim, in accordance with the present invention, an electrostatic pinning method and/or a liquid-coating pinning method are preferably adopted.

The electrostatic pinning method generally means a method in which a wire electrode is disposed over an upper surface of the laminated sheet so as to extend in the direction perpendicular to the feed direction of the laminated sheet, and a D.C. voltage of about 5 to about 15 kV is applied to the wire electrode to produce a static charge on the laminated sheet, thereby enhancing the adhesion between the laminated sheet and the rotary cooling drum. On the other hand, the liquid-coating pinning method means a method in which the adhesion between the laminated sheet and the rotary cooling drum is enhanced by coating a liquid on a part (for example, only surface regions which come into contact with opposite peripheral edges of the laminated sheet) or a whole of an outer surface of the rotary cooling drum. In the present invention, both the methods may be used in combination, if required.

Successively, the thus-obtained unstretched laminated sheet is stretched in at least one direction to form a film. The fine cells in the A layer of the laminated polyester film according to the present invention can be produced in the afore-mentioned stretching process. Accordingly, it is required that the stretching is conducted under the suitable conditions which can produce the fine cells in a well-controlled manner and can satisfy the Requirements such as a strength or dimensional stability of the laminated polyester film. For this reason, the following biaxially-stretching method and heat-treating method are suitably used.

In the stretching process, the unstretched sheet is first stretched in one (longitudinal) direction at a drawing temperature of usually 70 to 150° C., preferably 75 to 130° C. and a draw ratio of usually 3.0 to 7 times, preferably 3.2 to 6 times. Such a stretching may be conducted by using a roll-type or tenter-type stretching machine. Next, the longitudinally-stretched sheet is stretched in the direction (transverse direction) perpendicular to the preceding stretching direction at a drawing temperature of usually 75 to 150° C., preferably 80 to 140° C. and a draw ratio of usually 3.0 to 7 times, preferably 3.2 to 6 times to obtain a biaxially oriented film. The latter stretching may also be conducted by using the tenter-type stretching machine.

The stretching in each direction can also be conducted in two or more stages. Alternatively, the afore-mentioned unstretched sheet can be subjected to a simultaneous biaxial stretching. Further, the biaxially-stretched film may be re-stretched in the longitudinal (machine) direction at a drawing temperature of 110 to 180° C. and a draw ratio of 1.05 to 2.0 times. In this case, various procedures such as heat setting before the longitudinal re-stretching, longitudinal relaxation after the longitudinal re-stretching, fine longitudinal stretching before or after the longitudinal re-stretching, or the like can be appropriately used. Similarly, the biaxially-stretched film can be re-stretched in the transverse direction. In any case, it is preferred that a total draw ratio of these stretching processes is adjusted such that a surface area of the film is 10 to 40 times that of the unstretched sheet.

The heat treatment of the laminated polyester film may be conducted at 150 to 250° C. for 1 second to 5 minutes under the condition of an elongation of not more than 30%, a limited shrinkage or a constant length. Alternatively, after the biaxial stretching, the film may be further re-stretched in the longitudinal direction at a drawing temperature of 110 to 180° C. and a draw ratio of 1.05 to 2.0 times, and then subjected to the afore-mentioned heat-treatment. In this case, various appropriate procedures such as heat setting before the longitudinal re-stretching, longitudinal relaxation after the longitudinal re-stretching, fine longitudinal stretching before or after the longitudinal re-stretching, or the like can also be adopted. Further, the sheet may be subjected to various surface treatments during the film-forming process, if required.

The laminated polyester film (I) according to the present invention can exhibit a reduced weight per a unit volume because a fine cell-containing layer is provided therein, and good cushioning property. Further, by such an arrangement that a relatively thin layer having a high concentration of fluorescent whitening agent is laminated over the fine cell-containing layer, the resultant laminated film can show a sufficient yellowness on a surface thereof. For this reason, especially when the laminated film (I) according to the present invention is applied to image-receiving papers for various printers, images having a high quality can be formed thereon. Further, since the total amount of the fluorescent whitening agent can be effectively reduced, there is an advantage of lowering the production cost.

The laminated film (II) according to the present invention can also have a reduced weight per a unit volume because a fine cell-containing layer is provided therein. Further, since the thickness of a polyester layer, which is to be laminated over a surface of the fine cell-containing layer and contains substantially no fine cells, is limited to a specific range depending upon particle diameters of the dispersed particles in the unstretched sheet, the surface conditions thereof can be prevented form being adversely affected by the waviness or waviness due to the fine cells, without damage to cushioning property thereof. Furthermore, since the yellowness and the optical density of the laminated film (II) are adjusted appropriately, a fine and clear image quality can be achieved when the film is applied to an image-receiving paper for various printers.

Further, the laminated film (III) according to the present invention can also have a reduced weight per a unit volume because a fine cell-containing layer is provided therein. Further, since the thickness of a polyester layer, which is to be laminated over a surface of the fine cell-containing layer and contains substantially no fine cells, is limited to a specific range, it can be prevented without damage to the flexibility of the laminated film (III), that surfaces of cast rolls or stretching rolls are soiled by the fine cell-containing layer in the production process. Especially when the laminated film (III) is applied to a mount for seal print, images having a high quality can be obtained.

EXAMPLES

The present invention is described in more detail below by way of examples. However, these examples are only illustrative and not intended to constitute a limitation of the present invention and it is to be understood that other and further modifications and changes can be made without departing from the spirits and the scope of the present invention.

Incidentally, in Examples and Comparative Examples, "part or parts" represents "part or parts by weight"; the melt flow index (MIF) of crystalline polypropylene used was 10 g/10 min; the average particle diameter of titanium oxide was 0.3 $\mu$m; "OB-1" (produced by Eastern Kodak Corp.) was used as a fluorescent whitening agent; and "SH-193" (produced by Toray Dow Corning Co., Ltd.) was used as a silicone-based surfactant.

Various parameters and properties described hereinafter were measured or evaluated in the following manner.

(1) Intrinsic viscosity [$\eta$] (dl/g):

One gram of polyester from which polymer components immiscible with Polyester and pigments were removed, was dissolved in 100 ml of a mixed solvent comprising phenol and tetrachloroethane at weight ratio of 50:50. The intrinsic viscosity of the polyester solution was measured at 30° C.

(2) Film density (g/cm$^3$):

A square sample having a size of 10 cm×10 cm was cut from an optional portion of the film. The weight of the sample was measured and the thickness thereof was measured by a micrometer at optional 9 points thereof to obtain an average thickness. The weight per unit volume of the sample was calculated from the weight and the average thickness measured above. Five different samples (number of measurements "n"=5) were measured and the average of the measured values was calculated to obtain a film density. Incidentally, in the case where the film had a plurality of layers, after the thicknesses of the respective layers were measured by a transmission-type electron microscope, a surface layer of the film was abraded by a microtome and the density of the surface layer was measured by a density gradient tube. Based on the thus-obtained density of the surface layer, densities of the other layers (intermediate layers) were calculated.

(3) Yellowness (B value):

The color tone (L, a, b) of the film was measured by a color analyzer ("TC-1800MKII-Model manufactured by Tokyo Denshoku Co., Ltd.) according to JIS Z-8722. The yellowness of the film was represented by the B value thereof. The larger positive (+) B value indicates a higher yellowness of the film. The yellowness of the film was evaluated by the average of the B values measured at three different points thereon.

(4) Optical density

A visual light was irradiated over the film and the intensity of light transmitted through the film was measured by a Macbeth illuminometer "TD-904 Model". The measurement was conducted at five different points on the film and the optical density of the film was determined as the average of the five measured values. The larger value of the optical density indicates that the film has a lower light transmittance.

(5) Average particle diameter of pigment and particle size distribution thereof:

The particle diameters of the pigment were measured by a centrifugal sedimentation-type particle size distribution measuring apparatus ("SA-CP3 Model" manufactured by Shimazu Seisakusho Co., Ltd.). The particle diameter of the pigment particles having a cumulative volume fraction of 50% in the equivalent spherical distribution was determined as the average particle diameter.

(6) Melt flow index (MFI) (g/10 min):

The melt flow index of the film was measured according to JIS K-6758(1981). The higher MFI value indicates a lower melt viscosity of the polymer.

(7) Evaluation for printability by laser printer:

The film was cut into A4-size sheet on which characters were then printed by using a laser printer ("PC-PR1000/4 Model" manufactured by Nippon Electric Co., Ltd.). The characters printed on the sheet were visually observed to examine the clarity or definition of characters printed, the presence of voids and the occurrence of paper-jamming upon printing. The results of the visual observation were classified into the following ranks:

◯: High quality.

Δ: Slightly deteriorated but still practically usable.

x: practically unusable (8) Thickness of respective layers:

The cross section of the film was observed by a transmission-type electron microscope (TEM). Specifically, a small piece of the film was wrapped and embedded in an epoxy resin in which a hardening agent and an accelerating agent were blended. The thus-obtained film was cut into a piece having a thickness of about 200 nm by an ultramicrotome to form a sample for observation. A microphotograph of a cross-section of the sample was taken by a transmission-type electron microscope ("H-9000" manufactured by Hitachi Ltd.) to measure the thicknesses of the respective layers of the sample. In the measurement, the transmission-type electron microscope was adjusted such that the accelerating voltage was 300 kv and the magnification was in the range of 10,000 to 100,000 times according to the thickness of an outermost layer of the sample. The thickness measurement was conducted at fifty different points of every layer. The higher 10 values measured and lower 10 values measured were ignored and the remaining 30 values measured were taken into consideration. The average of the 30 values measured was determined as the thickness of each layer.

(9) Effects of reducing an amount of fluorescent whitening agent (OB-1) used:

The concentrations of the fluorescent whitening agent (OB-1) totally added to raw materials of the respective films were compared with each other. The films having a higher concentration of the fluorescent whitening agent than a reference concentration "0.05% by weight" were marked with "x", while those having a lower concentration of the fluorescent whitening agent than the reference concentration were marked with "○".

(10) Evaluation of printability by color printer:

The film was cut into an A4-size sheet on which images were printed by a thermal transfer recording method by using a color printer ("CX-5000 Model" manufactured by Sharp Corp.). The thus-obtained hard copy was visually observed to examine the image concentration, the voids and the clarity or definition of images. The results of the visual observation were classified into the following ranks:

○: high quality.

Δ: Slightly deteriorated but still practically usable.

x: practically unusable.

(11) Average particle diameter (μm) of dispersed polypropylene (PP) particles in unstretched sheet:

A sample for observing an cross section thereof was prepared in the same manner as defined in the above item (8) and then dyed with ruthenium tetroxide. The microphotograph of the cross section of the sample, which was magnified by 500 to 3,000 times, was taken by the transmission-type electron microscope ("H-9000" manufactured by Hitachi Ltd.). By using the thus-obtained ten microphotographs, the distribution of diameters of circles corresponding to the cross sections of the dispersed PP particles was measured by an image-processing system ("Quantimet 500", manufactured by Leika-Cambrige Corp.). The average of the measured circle diameters was determined as an average particle diameter of the dispersed polypropylene particles.

(12) Center line average surface roughness ($R_a$):

The center line average surface roughness ($R_a$) of the film was measured by a universal surface measuring device ("SE-3F" manufactured by Kosaka Kenkyusho Co., Ltd.). The measurement was conducted 12 times every sample. The lowermost and uppermost measured values were ignored and the remaining ten measured values were taken into consideration. The average of the remaining ten measured values was determined as the average surface roughness ($R_a$) of the sample. The measuring conditions used were a radius of the stylus: 2 μm; a load applied: 0.03 gf; a measuring length: 2.5 mm; and a cut-off value: 0.08 nm.

(13) Evaluation of printability by video printer:

Images were printed by a thermal transfer recording method on the B layer of the laminated film by using a video printer ("GZ-P11W" manufactured by Sharp Corp.). The thus-obtained hard copy was visually observed to examine the concentration of the images, the voids on the images printed and the clarity or definition of the images printed.

The results of the visual observation were classified into the following ranks:

○: high quality.

Δ: Slightly deteriorated but still practically usable.

x: practically unusable.

(14) Soil of cast rolls upon the film production:

The cast rolls were operated continuously for 5 days under the conditions defined in Examples hereinafter. Thereafter, the cast rolls were visually observed. The results of the visual observation were classified into the following ranks:

○: Clear surface.

x: Accumulated soils on the surface.

(15) Suitability for a mount for seal print:

Delustering degree of the laminated film was visually observed and the flexibility thereof was evaluated by hand feeling. The results were classified into the following ranks:

○: high quality.

Δ: Slightly deteriorated but still practically usable.

x: practically unusable.

COMPARATIVE EXAMPLE 1

16.7% by weight of crystalline polypropylene, 2.5% by weight of titanium oxide and 0.3% by weight of the silicone-based surfactant were added to 80.5% by weight of polyethylene terephthalate having an intrinsic viscosity of 0.69 and then the mixture was uniformly blended to prepare a polyester raw material $B_1$. Separately, 2.5% by weight of titanium oxide was added to 97.5% by weight of polyethylene terephthalate having an intrinsic viscosity of 0.69 and then the mixture was uniformly blended to prepare a polyester raw material $A_1$. Incidentally, the above-mentioned weight percentages of the respective components are based on the total weight of each of the raw materials, which is also applied to the weight percentages appearing throughout the following Examples and Comparative Examples.

The respective raw materials were charged into separate extruders and melted at 290° C. The thus-obtained molten raw materials were introduced into a common die and melt-extruded through slit-like openings such that outer layers made of the raw material $B_1$ were laminated outer opposite surfaces of an inner layer made of the raw material $A_1$. The laminate was passed over a cooling drum maintained at 40° C. to prepare a co-extruded unstretched sheet having three layers made of two different raw materials. The unstretched sheet was stretched in the longitudinal direction at a drawing temperature of 85° C. and a draw ratio of 3.4 times. Further, the uniaxially stretched sheet was stretched in the transverse direction at a drawing temperature of 110° C. and a draw ratio of 3.2 times and then heat-treated at 230° C. for 5 seconds to finally prepare a biaxially stretched laminated film having a thickness of 50 μm and a density of 0.97 g/cm³. The thus-prepared laminated film was evaluated to determine various properties and characteristics thereof. The results are shown in Tables 1 to 3. It was found that the laminated film had a high b value and therefore was deteriorated in image-receiving capability.

EXAMPLE 1

The same procedure for the preparation of the raw material $A_1$ as defined in Comparative Example 1 was conducted except that the amount of titanium oxide added was changed to 7.0% by weight to prepare a polyester raw material $C_1$. Separately, 7.0% by weight of titanium oxide and $5 \times 10^{-2}$% by weight of the fluorescent whitening agent were added to 92.95% by weight of polyethylene terephthalate having an intrinsic viscosity of 0.69 and then the mixture was uniformly blended to prepare a polyester raw material $D_1$. Successively, a biaxially stretched laminated film having a three-layer structure of $D_1/C_1/D_1$ made of two different kinds of materials was prepared in the same manner as defined in Comparative Example 1. The thus-prepared laminated film was evaluated to determine various properties and characteristics thereof. The results are shown in Tables 1 to 3. It was found that the laminated film were excellent in image-receiving capability.

COMPARATIVE EXAMPLE 2

Film scraps discharged during the preparation of the laminated film of Comparative Example 1 was fed into a twin-screw extruder and melt-extruded to prepare reclaimed raw material X. Polyethylene terephthalate in the reclaimed raw material X had an intrinsic viscosity of 0.61.

44.05% by weight of polyethylene terephthalate having an intrinsic viscosity of 0.74 was uniformly blended with 40% by weight of the reclaimed raw material X, 13% by weight of crystalline polypropylene and 0.15% by weight of the fluorescent whitening agent, and then with 2.5% by weight of titanium oxide and 0.3% by weight of the silicone-based surfactant to prepare a polyester raw material $E_1$. Separately, 7% by weight of titanium oxide and $5.0 \times 10^{-2}$% by weight of the fluorescent whitening agent were added to 92,95% by weight of polyethylene terephthalate having an intrinsic viscosity of 0.69 and then the mixture was uniformly blended to prepare a polyester raw material $F_1$. Successively, a biaxially stretched laminated film having a three-layer structure of $F_1/E_1/F_1$ made of two different kinds of raw materials was prepared in the same manner as defined in Comparative Example 1. The thus-prepared laminated film was evaluated to determine various properties and characteristics thereof. The results are shown in Tables 1 to 3. It was found that the laminated film was disadvantageous in the production cost because a large amount of the fluorescent whitening agent was used therefor, though it was excellent in image-receiving capability.

EXAMPLE 2

44.2% by weight of polyethylene terephthalate having an intrinsic viscosity of 0.74 was uniformly blended with 40% by weight of the reclaimed raw material X and 13% by weight of crystalline polypropylene, and then with 2.5% by weight of titanium oxide and 0.3% by weight of the silicone-based surfactant to prepare a polyester raw material $G_1$. Separately, 7% by weight of titanium oxide and $10 \times 10^{-2}$% by weight of the fluorescent whitening agent were added to 92.9% by weight of polyethylene terephthalate having an intrinsic viscosity of 0.69 and then the mixture was uniformly blended to prepare a polyester raw material $H_1$. Successively, a biaxially stretched laminated film having a three-layer structure of $H_1/G_1/H_1$ made of two different kinds of raw materials was prepared in the same manner as defined in Comparative Example 1. The thus-prepared laminated film was evaluated to determine various properties and characteristics thereof. The results are shown in Tables 1 to 3. It was found that the laminated film was excellent in image-receiving capability.

COMPARATIVE EXAMPLE 3

20% by weight of the reclaimed raw material x, 13% by weight of crystalline polypropylene and 0.3% by weight of the silicone-based surfactant were added to 66.7% by weight of polyethylene terephthalate having an intrinsic viscosity of 0.71 and then the mixture was uniformly blended to prepare a polyester raw material $I_1$. Separately, $1.0 \times 10^{-2}$% by weight of the fluorescent whitening agent was added to 99.9% by weight of polyethylene terephthalate having an intrinsic viscosity of 0.69 and then the mixture was uniformly blended to prepare a polyester raw material $J_1$. Successively, a biaxially stretched laminated film having a three-layer structure of $J_1/I_1/J_1$ made of two different kinds of raw materials was prepared in the same manner as defined in Comparative Example 1. The thus-prepared laminated film was evaluated to determine various properties and characteristics thereof. The results are shown in Tables 1 to 3. It was found that the laminated film was deteriorated in image-receiving capability.

COMPARATIVE EXAMPLE 4

The same polyester raw material $C_1$ as prepared in Example 1 was used in this Comparative Example. Separately, 35% by weight of titanium oxide and $5.0 \times 10^{-2}$% by weight of the fluorescent whitening agent were added to 64.95% by weight of polyethylene terephthalate having an intrinsic viscosity of 0.69 and then the mixture was uniformly blended to prepare a polyester raw material $K_1$. Successively, a biaxially stretched laminated film having a three-layer structure of $K_1/C_1/K_1$ made of two different kinds of raw materials was prepared in the same manner as defined in Comparative Example 1. The thus-prepared laminated film was evaluated to determine various properties and characteristics thereof. The results are shown in Tables 1 to 3. It was found that the laminated film was deteriorated in image-receiving capability.

COMPARATIVE EXAMPLE 5

The same polyester raw material $D_1$ as prepared in Example 1 was used in this Comparative Example. Separately, 3% by weight of crystalline polypropylene and 7.0% by weight of titanium oxide were added to 90% by weight of polyethylene terephthalate having an intrinsic viscosity of 0.69 and then the mixture was uniformly blended to prepare a polyester raw material $L_1$. Successively, a biaxially stretched laminated film having a three-layer structure of $D_1/L_1/D_1$ made of two different kinds of raw materials was prepared in the same manner as defined in Comparative Example 1. The thus-prepared laminated film was evaluated to determine various properties and characteristics thereof. The results are shown in Tables 1 to 3. It was found that the laminated film was deteriorated in image-receiving capability.

COMPARATIVE EXAMPLE 6

The same polyester raw material $D_1$ as prepared in Example 1 was used in this Comparative Example. Separately, 50% by weight of crystalline polypropylene and 7.0% by weight of titanium oxide were added to 43% by weight of polyethylene terephthalate having an intrinsic viscosity of 0.69 and then the mixture was uniformly blended to prepare a polyester raw material $M_1$. Successively, a biaxially stretched laminated film having a three-layer structure of $D_1/M_1/D_1$ made of two different kinds of raw materials was prepared in the same manner as defined in comparative Example 1. The thus-prepared laminated film was evaluated to determine various properties and characteristics thereof. The results are shown in Tables 1 to 3. It was found that the laminated film was deteriorated in image-receiving capability.

TABLE 1

| | Density (g/cm³) B layer | Density (g/cm³) A layer | Thickness of each layer (μm) B layer | Thickness of each layer (μm) A layer | Content in film (% by weight) B layer TiO₂ | Content in film (% by weight) A layer PP |
|---|---|---|---|---|---|---|
| Comparative Example 1 | 1.44 | 0.92 | 2.5 | 45 | 2.5 | 16.7 |
| Example 1 | 1.44 | 0.90 | 12.5 | 25 | 7 | 16.7 |
| Comparative Example 2 | 1.44 | 1.05 | 2.5 | 45 | 7 | 19.7 |
| Example 2 | 1.44 | 1.05 | 2.5 | 45 | 7 | 19.7 |
| Comparative Example 3 | 1.40 | 0.95 | 2.5 | 45 | 0 | 16.3 |
| Comparative Example 4 | 1.52 | 0.89 | 2.5 | 45 | 35 | 16.7 |
| Comparative Example 5 | 1.44 | 1.33 | 2.5 | 45 | 7 | 3 |
| Comparative Example 6 | 1.44 | 0.58 | 2.5 | 45 | 7 | 50 |

TABLE 2

| | Amount of "OB-1" added (% by weight) in B layer | Amount of "OB-1" added (% by weight) in whole layer | Effects of reducing amount of "OB-1" | Film properties b value of surface of B layer | Film properties Optical density |
|---|---|---|---|---|---|
| Comparative Example 1 | 0 | 0 | — | −0.8 | 0.7 |
| Example 1 | 0.05 | 0.025 | ○ | −2.8 | 0.8 |
| Comparative Example 2 | 0.05 | 0.14 | X | −3.0 | 0.7 |
| Example 2 | 0.1 | 0.01 | ○ | −3.2 | 0.7 |
| Comparative Example 3 | 0.01 | 0.001 | ○ | −2.0 | 0.2 |
| Comparative Example 4 | 0.05 | 0.005 | ○ | −2.5 | 1.0 |
| Comparative Example 5 | 0.05 | 0.005 | ○ | −3.1 | 0.6 |
| Comparative Example 6 | 0.05 | 0.005 | ○ | −3.4 | 0.5 |

TABLE 3

| | Image-receiving capability Concentration of image printed | Image-receiving capability Voids in image printed | Image-receiving capability Clarity of image printed |
|---|---|---|---|
| Comparative Example 1 | ○ | ○ | X |
| Example 1 | ○ | ○ | ○ |
| Comparative Example 2 | ○ | ○ | ○ |
| Example 2 | ○ | ○ | ○ |
| Comparative Example 3 | ○ | ○ | X |
| Comparative Example 4 | X | X | ○ |
| Comparative Example 5 | ○ | X | ○ |
| Comparative Example 6 | X | X | ○ |

EXAMPLE 3

15% by weight of crystalline polypropylene (PP) chips, 2% by weight of titanium oxide, 0.05% by weight of the fluorescent whitening agent and 0.2% by weight of the silicone-based surfactant were added to 82.75% by weight of polyethylene terephthalate having an intrinsic viscosity of 0.69 and then the mixture was uniformly blended to prepare a polyester raw material $A_2$. Separately, 92.95% by weight of the same polyethylene terephthalate as used above was uniformly blended with 7% by weight of titanium oxide and 0.05% by weight of the fluorescent whitening agent to prepare a polyester raw material $B_2$.

The respective raw materials were charged into separate extruders and melted at 290° C. The thus-obtained molten raw materials were introduced into a common three-layered die and melt-extruded through slit-like openings such that outer layers made of the raw material $B_2$ were laminated over opposite surfaces of an intermediate layer made of the raw material $A_2$. The laminate was passed over a cooling drum maintained at 40° C. and rapidly cooled to prepare a co-extruded unstretched sheet having three layers made of two different raw materials. The size of the polypropylene (PP) dispersed particles in the $A_2$ layer of the unstretched sheet was measured. The measurement revealed that the average particle diameter thereof was 6.0 μm.

The unstretched sheet was stretched in the feeding (longitudinal) direction at a drawing temperature of 85° C. and a draw ratio of 3.4 times. Further, the uniaxially stretched sheet was stretched in the transverse direction at a drawing temperature of 110° C. and a draw ratio of 3.2 times and then heat-treated at 230° C. for 5 seconds to prepare a biaxially stretched laminated film. The thicknesses of the respective layers of the thus-prepared laminated film were $B_2/A_2/B_2=2$ μm/40 μm/2 μm and the density of the laminated film was 0.88 g/cm³.

COMPARATIVE EXAMPLE 7

The same procedure as defined in Example 3 was conducted except that the thicknesses of the respective layers of the laminated film were changed to those shown in Table 4. Specifically, an unstretched sheet containing the polypropylene (PP) dispersed particles having an average particle diameter of 6.0 μm in the $A_2$ layer thereof was prepared. The thus-prepared unstretched sheet was stretched and heat-treated to prepare a biaxially stretched laminated film. The thicknesses of the respective layers of the thus-prepared laminated film were $B_2/A_2/B_2=20$ μm/40 μm/20 μm and the density of the laminated film was 1.13 g/cm³.

COMPARATIVE EXAMPLE 8

The same procedure as defined in Example 3 was conducted except that the thicknesses of the respective layers of the laminated film were changed to those shown in Table 4. Specifically, an unstretched sheet containing the dispersed polypropylene (PP) particles having an average particle diameter of 6.0 μm in the $A_2$ layer thereof was prepared. The thus-prepared unstretched sheet was stretched and heat-treated to prepare a biaxially stretched laminated film. The thicknesses of the respective layers of the thus-prepared laminated film were $B_2/A_2/B_2=0.2$ μm/40 μm/0.2 μm and the density of the laminated film was 0.83 g/cm³.

EXAMPLE 4

Film scraps discharged during the preparation of the laminated film of Example 6 were fed into a twin-screw extruder and melt-extruded to prepare reclaimed raw material X. Polyethylene terephthalate in the reclaimed raw material X had an intrinsic viscosity of 0.61.

65.16% by weight of virgin polyethylene terephthalate having an intrinsic viscosity of 0.66 was uniformly blended with 20% by weight of the reclaimed raw material X, 13% by weight of crystalline polypropylene and 0.04% by weight of the fluorescent whitening agent, both of which were the same as those used in Example 3, and then blended with 1.6% by weight of titanium oxide and 0.2% by weight of the silicone-based surfactant to prepare a raw material composition $C_2$. Separately, 7% by weight of titanium oxide and 0.15% by weight of the fluorescent whitening agent were added to 92,85% by weight of polyethylene terephthalate having an intrinsic viscosity of 0.65 and then the mixture was uniformly blended to prepare a raw material composition $D_2$.

The same procedure as defined in Example 3 was conducted except that the above-prepared raw material compositions were used. Specifically, the respective raw material compositions were melt-extruded from a three-layered die such that outer layers made of the raw material composition $D_2$ were laminated over opposite surfaces of an intermediate layer made of the raw material composition $C_2$. As a result, a co-extruded unstretched sheet having three layers made of the two different raw material compositions was prepared. The dispersed polypropylene (PP) particles contained in the intermediate layer of the unstretched sheet had an average particle diameter of 4.5 μm.

The unstretched sheet was stretched in the machine (longitudinal) direction at a drawing temperature of 85° C. and a draw ratio of 3.4 times. Further, the uniaxially stretched sheet was stretched in the transverse direction at a drawing temperature of 110° C. and a draw ratio of 3.2 times and then heat-treated at 230° C. for 5 seconds to finally prepare a biaxially stretched laminated film. The thicknesses of the respective layers of the thus-prepared laminated film were $D_2/C_2/D_2$=1.5 μm/35 μm/1.5 μm and the density of the laminated film was 1.03 g/cm³.

COMPARATIVE EXAMPLE 9

The same procedure as defined in Example 4 was conducted except that the thicknesses of the respective layers of the laminated film were changed to those shown in Table 4. Specifically, an unstretched sheet containing the dispersed polypropylene (PP) particles having an average particle diameter of 4.5 μm in the $C_2$ layer thereof was prepared. The thus-prepared unstretched sheet was stretched and heat-treated to prepare a biaxially stretched laminated film. The thicknesses of the respective layers of the thus-prepared laminated film were $D_2/C_2/D_2$=15 μm/35 μm/15 μm and the density of the laminated film was 1.20 g/cm³.

COMPARATIVE EXAMPLE 10

The same procedure as defined in Example 4 was conducted except that the thicknesses of the respective layers of the laminated film were changed to those shown in Table 4. Specifically, an unstretched sheet containing the dispersed polypropylene (PP) particles having an average particle diameter of 4.5 μm in the $C_2$ layer thereof was prepared. The thus-prepared unstretched sheet was stretched and heat-treated to prepare a biaxially stretched laminated film. The thicknesses of the respective layers of the thus-prepared laminated film were $D_2/C_2/D_2$=0.15 μm/35 μm/0.15 μm and the density of the laminated film was 0.99 g/cm³.

The laminated films prepared in Examples 3 to 4 and Comparative Examples 7 to 10 were measured and evaluated to determine various properties and characteristics thereof. The results are shown in Tables 4 and 5.

TABLE 4

| | Intermediate layer | | | | |
|---|---|---|---|---|---|
| | Amount of PP blended (% by weight) | Amount of reclaimed raw material blended (% by weight) | Average particle diameter of dispersed PP particles in unstretched sheet (μm) | Thickness of respective layers (μm) ($B_2/A_2/B_2$) or ($D_2/C_2/D_2$) | Density (g/cm³) |
| Example 3 | 15 | 0 | 6.0 | 2/40/2 | 0.88 |
| Comparative Example 7 | 15 | 0 | 6.0 | 20/40/20 | 1.13 |
| Comparative Example 8 | 15 | 0 | 6.0 | 0.2/40/0.2 | 0.83 |
| Example 4 | 13 | 20 | 4.5 | 1.5/35/1.5 | 1.03 |
| Comparative Example 9 | 13 | 20 | 4.5 | 15/35/15 | 1.20 |
| Comparative Example 10 | 13 | 20 | 4.5 | 0.15/35/0.15 | 0.99 |

TABLE 5

| | Film properties | | | Image-receiving capability or printability | | |
|---|---|---|---|---|---|---|
| | Yellowness (b value) | Optical density | Surface roughness Ra (μm) | Concentration of image printed | Voids in image printed | Clarity of image printed |
| Example 3 | −3.2 | 0.6 | 0.15 | ○ | ○ | ○ |
| Comparative Example 7 | −3.0 | 0.7 | 0.06 | ○ | X | ○ |

TABLE 5-continued

| | Film properties | | | Image-receiving capability or printability | | |
|---|---|---|---|---|---|---|
| | Yellowness (b value) | Optical density | Surface roughness Ra (μm) | Concentration of image printed | Voids in image printed | Clarity of image printed |
| Comparative Example 8 | −3.2 | 0.6 | 0.39 | X | ◯ | ◯ |
| Example 4 | −2.0 | 0.5 | 0.12 | ◯ | ◯ | ◯ |
| Comparative Example 9 | −2.7 | 0.6 | 0.06 | ◯ | X | ◯ |
| Comparative Example 10 | −1.8 | 0.5 | 0.32 | X | ◯ | ◯ |

EXAMPLE 5

13% by weight of crystalline polypropylene chips, 2.4% by weight of titanium oxide, 0.05% by weight of the fluorescent whitening agent and 0.1% by weight of the silicone-based surfactant were added to 84.45% by weight of polyethylene terephthalate having an intrinsic viscosity of 0.69 and then the mixture was uniformly blended to prepare a polyester raw material $A_3$. Separately, 2.4% by weight of titanium oxide and 0.05% by weight of the fluorescent whitening agent were added to 97.55% by weight of polyethylene terephthalate having an intrinsic viscosity of 0.69 and then the mixture was uniformly blended to prepare a polyester raw material $B_3$.

The respective raw materials were charged into separate extruders and melted at 290° C. The thus-obtained molten raw materials were introduced into a common die and melt-extruded through slit-like openings such that outer layers made of the raw material $B_3$ were laminated over opposite surfaces of an inner layer made of the raw material $A_3$. The laminate was passed over a cooling drum maintained at 40° C. and rapidly cooled to prepare a co-extruded unstretched sheet having three layers made of two different raw materials. The unstretched sheet was stretched in the machine (longitudinal) direction at a drawing temperature of 85° C. and a draw ratio of 3.4 times. Further, the uniaxially stretched sheet was stretched in the transverse direction at a drawing temperature of 110° C. and a draw ratio of 3.1 times and then heat-treated at 230° C. for 5 seconds to finally prepare a biaxially stretched laminated film. The thicknesses of the respective layers of the thus-prepared laminated film were $B_3/A_3/B_3=0.5$ μm/100 μm/0.5 μm and the density of the laminated film was 0.98 g/cm$^3$.

EXAMPLE 6

The same procedure as defined in Example 5 was conducted except that the thicknesses of the respective layers of the laminated film were changed to $B_3/A_3/B_3=2.5$ μm/100 μm/2.5 μm. The thus-prepared biaxially-stretched laminated film had the density of the laminated film was 1.00 g/cm$^3$.

COMPARATIVE EXAMPLE 11

The same procedure as defined in Example 5 was conducted except that the thicknesses of the respective layers of the laminated film were changed to $B_3/A_3/B_3=8.3$ μm/8.3 μm/8.3 μm. The thus-prepared biaxially-stretched laminated film had the density of the laminated film was 1.05 g/cm$^3$.

COMPARATIVE EXAMPLE 12

The same procedure as defined in Example 5 was conducted except that only the raw material for the $A_3$ layer was used and no $B_3$ layer was provided thereon, so that a biaxially-stretched single-layered film having a thickness of 100 μm and a density of 0.98 g/cm$^3$ was prepared.

EXAMPLE 7

Film scraps discharged during the preparation of the laminated film of Example 5 were fed into a twin-screw extruder and melt-extruded to prepare reclaimed raw material X. Polyethylene terephthalate in the reclaimed raw material X had an intrinsic viscosity of 0.61.

64.46% by weight of polyethylene terephthalate having an intrinsic viscosity of 0.66 was uniformly blended with 20% by weight of the above-prepared reclaimed raw material X, 13% by weight of the same crystalline polypropylene as used in Example 8 and 0.04% by weight of "OB-1" as a fluorescent whitening agent, and then with 2.4% by weight of titanium oxide and 0.1% by weight of the silicone-based surfactant to prepare a raw material $C_3$. Separately, 2.4% by weight of titanium oxide and 0.05% by weight of the fluorescent whitening agent were added to 97.55% by weight of polyethylene terephthalate having an intrinsic viscosity of 0.65 and then the mixture was uniformly blended to prepare a raw material $D_3$.

The same procedure as defined in Example 5 was conducted except that the above-prepared raw materials were used. Specifically, the respective raw materials were melt-extruded such that outer layers made of the raw material $D_3$ were laminated over opposite surfaces of an inner layer made of the raw material $C_3$. As a result, a co-extruded unstretched sheet having three layers made of the two different raw materials was prepared. The unstretched sheet was stretched in the machine (longitudinal) direction at a drawing temperature of 85° C. and a draw ratio of 3.4 times. Further, the uniaxially stretched sheet was stretched in the transverse direction at a drawing temperature of 110° C. and a draw ratio of 3.1 times and then heat-treated at 230° C. for 5 seconds to finally prepare a biaxially stretched laminated film. The thicknesses of the respective layers of the thus-prepared biaxially stretched laminated film were $D_3/C_3/D_3=0.5$ μm/100 μm/0.5 μm and the density of the biaxially stretched laminated film was 1.00 g/cm$^3$.

EXAMPLE 8

The same procedure as defined in Example 7 was conducted except that the thicknesses of the respective layers of the laminated film were changed as shown in Table 8. Specifically, the thicknesses of the respective layers of the thus-prepared biaxially-stretched laminated film were $D_3/C_3/D_3=2.5$ μm/100 μm/2.5 μm and the density of the laminated film was 1.02 g/cm$^3$.

The biaxially stretched films prepared in Examples 5 to 8 and Comparative Examples 11 to 12 were measured and evaluated to determine various properties and characteristics thereof. The results are shown in Table 8.

consisting of polyethylene, polypropylene, polymethyl pentene, polymethyl butene, polystyrene, polycarbonates, polyphenylene sulfide and liquid crystal polyesters.

TABLE 6

| | Intermediate layer | | | | |
|---|---|---|---|---|---|
| | Amount of PP blended (% by weight) | Amount of reclaimed raw material blended (% by weight) | Thickness of respective layers ($\mu$m) ($B_3/A_3/B_3$) or ($D_3/C_3/D_3$) | Thickness ratio ($T_A/T_B$) | Density of A layer (g/cm$^3$) |
| Example 5 | 13 | 0 | 0.5/100/0.5 | 100 | 0.98 |
| Example 6 | 13 | 0 | 2.5/100/2.5 | 20 | 0.98 |
| Comparative Example 11 | 13 | 0 | 8.3/83/8.3 | 5 | 0.98 |
| Comparative Example 12 | 13 | 0 | Single layer of 100 $\mu$m | — | 0.98 |
| Example 7 | 13 | 20 | 0.5/100/0.5 | 100 | 1.00 |
| Example 8 | 13 | 20 | 2.5/100/2.5 | 20 | 1.00 |

| | Film properties | | | Contamination | Suitability for mount for seal print | |
|---|---|---|---|---|---|---|
| | Yellowness (b value) | Optical density | Surface roughness Ra ($\mu$m) | of cast rolls upon production | Delustering | Flexibility |
| Example 5 | −3.5 | 0.7 | 0.37 | ○ | ○ | ○ |
| Example 6 | −3.5 | 0.7 | 0.15 | ○ | Δ | Δ |
| Comparative Example 11 | −3.6 | 0.7 | 0.07 | ○ | X | X |
| Comparative Example 12 | −3.5 | 0.7 | 0.41 | X | ○ | ○ |
| Example 7 | −2.1 | 0.7 | 0.39 | ○ | ○ | ○ |
| Example 8 | −2.6 | 0.7 | 0.14 | ○ | Δ | Δ |

What is claimed is:

1. A laminated polyester film which contains not more than 0.05% by weight of a fluorescent whitening agent and comprises:

a fine cell-containing polyester film comprising 55 to 95% by weight of polyester which has an intrinsic viscosity in the range of 0.45 to 1.0 when measured after being shaped into a film, and 5 to 45% by weight of an immiscible thermoplastic resin, said fine cell-containing polyester film having a density of 0.40 to 1.30 g/cm$^3$; and at least one other polyester film laminated as an outermost layer on at least one surface of said fine cell-containing polyester film, said other polyester film having a density of not less than 0.40 g/cm$^3$, said other polyester film containing not less than 0.01% by weight of a fluorescent whitening agent, and the concentration of the fluorescent whitening agent in said other polyester film being higher than that in said fine cell-containing polyester wherein the ratio of thickness of said fine cell-containing polyester film to the thickness of said other polyester film is represented by the formula $$10 \leq T_A/T_B \leq 500$$

where $T_A$ represents a thickness of the fine cell-containing polyester film and $T_B$ represents a total thickness of said other polyester film.

2. A laminated polyester film according to claim 1, wherein said thermoplastic resin is selected from a group 3. A laminated polyester film according to claim 1, wherein said thermoplastic resin is polypropylene having a melt flow index of 0.5 to 30 grams per 10 minutes.

4. A laminated polyester film according to claim 1, wherein said other polyester film contains 0.3 to 30% by weight of a white pigment based on the total weight of the other polyester film, the yellowness on a surface of said other polyester film is not more than +3.0 and the optical density of said other polyester film is not less than 0.3.

5. A laminated polyester film according to claim 4, wherein said white pigment has an average particle diameter of not more than 5.0 $\mu$m.

6. An image-receiving paper for a color printer, comprising the laminated polyester film defined in claim 4.

7. A laminated polyester film according to claim 1, wherein said fine cell-containing polyester film comprises dispersed particles of a thermoplastic resin and the thickness of said other polyester film is represented by the formula (1):

$$0.05d \leq T_B \leq 3d$$

where $T_B$ ($\mu$m) represents a thickness of the other polyester film after stretching and d ($\mu$m) represents an average particle diameter of the dispersed particles of the thermoplastic resin, contained in an unstretched sheet.

8. A laminated polyester film according to claim 7, wherein said other polyester film has a surface roughness $R_a$ of 0.08 to 0.30 $\mu$m and a yellowness of not more than +3.0 and a optical density of not less than 0.3.

9. An image-receiving paper for a video printer, comprising the laminated polyester film defined in claim 7.

10. A laminated polyester film according to claim 1, wherein the ratio of the thickness of said fine cell-containing polyester film to the thickness of said other polyester film is represented by the formula (2):

$$20 \leq T_A/T_B \leq 500 \tag{2}$$

where $T_A$ represents a thickness of the fine cell-containing polyester film and $T_B$ represents a total thickness of said other polyester film.

11. A laminated polyester film according to claim 10, wherein the optical density thereof is not less than 0.3 and the yellowness thereof is not more than +3.0.

12. A laminated polyester film according to claim 10, wherein the amount of the white pigment contained in the fine cell-containing polyester film is in the range of 0.5 to 20% by weight, and the amount of the white pigment contained in the other polyester film is in the range of 0 to 20% by weight.

13. A mount for seal print, comprising the laminated polyester film defined in claim 10.

14. A laminated polyester film according to claim 1, wherein the thickness of the laminated polyester film is in the range of 20 to 250 μm.

15. A laminated polyester film according to claim 14, wherein the thickness of said fine cell-containing polyester film is not less than 20% based on the total thickness of the laminated polyester film.

16. A laminated polyester film according to claim 1, wherein the polyester component of said fine cell-containing polyester film comprises a blended polyester comprising 40 to 95% by weight of virgin polyester and 5 to 60% by weight of reclaimed polyester.

17. A laminated polyester film according to claim 16, wherein said reclaimed polyester is those discharged from a process of the production of the laminated polyester film.

18. A laminated polyester film according to claim 16, wherein said blended polyester has an intrinsic viscosity of 0.45 to 0.72 when shaped into a film.

19. An image-receiving paper for a laser printer, comprising the laminated polyester film defined in claim 1.

20. A laminated polyester film according to claim 1, wherein the other polyester film contains 0.01 to 0.30% by weight of the fluorescent whitening agent.

21. A laminated polyester film according to claim 1, wherein the other polyester film contains more than 0.03% by weight more of said fluorescent whitening agent than said fine cell-containing polyester film.

22. A laminated polyester film as claimed in claim 1, wherein the ratio of thickness of said films is represented by the formula $50 \leq T_A/T_B \leq 500$.

23. A laminated polyester film as claimed in claim 1, wherein the ratio of thickness of said films is represented by the formula $80 \leq T_A/T_B \leq 500$.

* * * * *